(12) United States Patent
McKnight et al.

(10) Patent No.: US 9,004,226 B1
(45) Date of Patent: Apr. 14, 2015

(54) ACTIVELY TUNABLE LIGHTWEIGHT ACOUSTIC BARRIER MATERIALS

(71) Applicant: HRL Laboratories, LLC, Malibu, CA (US)

(72) Inventors: Geoffrey P. McKnight, Los Angeles, CA (US); Christopher P. Henry, Thousand Oaks, CA (US); Chia-Ming Chang, Los Angeles, CA (US); Andrew C. Keefe, Encino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/084,604

(22) Filed: Nov. 19, 2013

Related U.S. Application Data

(62) Division of application No. 13/564,408, filed on Aug. 1, 2012.

(51) Int. Cl.
*E04B 1/86* (2006.01)
*G10K 11/16* (2006.01)

(52) U.S. Cl.
CPC ..................................... *G10K 11/16* (2013.01)

(58) Field of Classification Search
CPC ........................................................ E04B 1/86
USPC ........................................................ 181/284
See application file for complete search history.

(56) References Cited

U.S. PATENT DOCUMENTS

| | | |
|---|---|---|
| 2,451,159 A | 2/1951 | Geiger |
| 4,149,612 A | 4/1979 | Bschorr |
| 4,325,461 A | 4/1982 | Bschorr |
| 5,719,824 A | 2/1998 | Boucher |
| 5,734,246 A | 3/1998 | Falangas |
| 5,851,626 A | 12/1998 | McCorry et al. |
| 6,576,333 B2 | 6/2003 | Sheng et al. |
| 6,778,673 B1 | 8/2004 | Hobelsberger |

(Continued)

FOREIGN PATENT DOCUMENTS

| | | |
|---|---|---|
| CA | 2067480 | 10/1992 |
| EP | 0495763 A1 | 1/1992 |

OTHER PUBLICATIONS

N. Hashimoto, M. Katsura, Y. Nashikawa, K. Katagihara, T. Torii, M. Nakata, Experimental Study on Sound Insulation of Membranes with Small Weights for Application to Membrane Structures, Applied Acoustics, 1996, pp. 71-84, vol. 48, No. 1, Elsevier Science Ltd., Great Britain.

N. Hashimoto, M. Katsura, M. Yasuoka, H. Fukii, Sound Insulation of a Rectangular Thin Membrane with Additional Weights, Applied Acoustics, 1991, pp. 21-43, vol. 33, Elsevier Science Publishers Ltd., England, Great Britain.

(Continued)

*Primary Examiner* — Forrest M Phillips
(74) *Attorney, Agent, or Firm* — Christopher R. Balzan (57) ABSTRACT

In one embodiment, provided is an actively tunable acoustic attenuator having a frame, a membrane within the frame, and a mass secured to the membrane. In another embodiment, provided is an actively tunable acoustic attenuator having a frame, a membrane within the frame, and a mass secured to the membrane. The membrane is coupled, either indirectly or directly, to the frame via a variable stiffness coupler. In another embodiment, provided is an actively tunable acoustic attenuator having a frame and a plurality of membrane layers within the frame. An active material is between at least two of the plurality of membrane layers. A mass is secured to at least one of the plurality of membrane layers.

13 Claims, 5 Drawing Sheets

(56) References Cited

U.S. PATENT DOCUMENTS

| | | | |
|---|---|---|---|
| 7,249,653 | B2 | 7/2007 | Sheng et al. |
| 7,263,028 | B2 | 8/2007 | Thomas et al. |
| 7,395,898 | B2 | 7/2008 | Yang et al. |
| 7,410,126 | B2 | 8/2008 | Drost |
| 7,550,189 | B1 | 6/2009 | McKnight et al. |
| 7,837,008 | B1 | 11/2010 | Lane et al. |
| 8,616,330 | B1 * | 12/2013 | McKnight et al. ............ 181/207 |
| 2005/0189165 | A1 | 9/2005 | Mathur |
| 2012/0161921 | A1 | 6/2012 | Browne et al. |
| 2013/0044049 | A1 | 2/2013 | Biggs et al. |

OTHER PUBLICATIONS

Bradley W. Ross and Ricardo A. Burdisso, Control of Low Frequency Structurally Radiated Noise with an Array of Weak Radiating Cells: An Experimental Study, Journal of Intelligent Material Systems and Structures, 1998, pp. 260-271, vol. 9, SAGE Social Science Collections. Accessible online at http://jim.sagepub.com/content/9/4/260.

Bradley W. Ross, Attenuation of Low Reequency Structurally Radiated Noise With an Array of Weak Radiating Cells, Thesis, Feb. 1998, pp. 1-121, Bradley W. Ross, Blacksburg, VA, United States.

* cited by examiner

ACTIVELY TUNABLE LIGHTWEIGHT ACOUSTIC BARRIER MATERIALS

CROSS REFERENCE TO RELATED APPLICATIONS

The present application is a divisional of U.S. patent application Ser. No. 13/564,408, by McKnight et al., entitled ACTIVELY TUNABLE LIGHTWEIGHT ACOUSTIC BARRIER MATERIAL, herein incorporated by reference in its entirety.

BACKGROUND

A stop band filter occurring over an anti-resonance frequency in a membrane is known to control noise transmission through structures.

Conventional "tunable" acoustic absorption is tuned by selecting different materials or changing dimension configurations, in advance, to achieve soundproofing for specific uses or locations. Such a conventional pre-tunable acoustic absorption lacks active tailoring capability and is heavy and bulky.

What is need is a tunable acoustic barrier material that is capable of active frequency tailoring. Furthermore, what is needed is a lightweight tunable acoustic barrier material that is capable of active frequency tailoring.

SUMMARY

In one embodiment, provided is an actively tunable acoustic attenuator having a frame, a membrane within the frame, and a mass secured to the membrane. In this embodiment, the membrane comprises an electroactive material.

In another embodiment, provided is an actively tunable acoustic attenuator having a frame, a membrane within the frame, and a mass secured to the membrane. The membrane is coupled, either indirectly or directly, to the frame via a variable stiffness coupler.

In another embodiment, provided is an actively tunable acoustic attenuator having a frame and a plurality of membrane layers within the frame. An active material is between at least two of the plurality of membrane layers. A mass is secured to at least one of the plurality of membrane layers.

BRIEF DESCRIPTION OF THE DRAWINGS

These and other features, aspects, and advantages of the principles of the present invention will become better understood with reference to the following description, appended claims, and accompanying drawings.

DESCRIPTION

Thin weighted membranes reflect incident sound energy. In various embodiments, active tuning of the characteristics of these membranes is possible to adjust the frequency band over which they are effective. Various means for actively tuning the transmission properties of a weighted membrane are disclosed herein.

A typical measured response for a weighted membrane in one dimensional transmission is a sharp drop off in transmission near the anti-resonance point. In general, there is a loss band of about 3 octaves of frequency with properties that substantially exceed the mass law for transmission loss across a limp barrier. In particular, a narrow region that exceeds the mass law by more than 40 dB is located between the first high transmission point and the second high transmission point. The first high transmission point occurs during the fundamental resonance of the membrane/mass assembly. Essentially, when the peak displacement occurs at the mass, motion is similar to a first order drum head mode. The second transmission window occurs when the membrane is in resonance with the central mass acting as a fixed boundary condition.

In various embodiments discussed below with reference to FIGS. 1-6B, the loss band may be actively shifted in frequency space. This allows frequency tracking of tonal noise sources that shift during application conditions.

To accomplish this shifting of the loss band, various parts of the structure may be actively controlled. In some embodiments, active control is achieved by stiffness modulation, or tension modulation, of the membrane. This may be accomplished by inherent material changes of the membrane, such as dielectric elastomers, PVDF, piezoelectric ceramics, or the like, or by the structural connectivity of the membrane portions such as SMP bridges, SMA, or the like. In other embodiments, active control is achieved through tension modulation by manipulating the cellular boundary condition such as by component edge actuation, or by distributed local actuation. In yet other embodiments, active control may be achieved through vibration amplitude modulation of the mass by use of active materials that controllably determine mass vibration, such as SMA or the like. In further embodiments, combinations of the above embodiments are possible.

Figure 1:
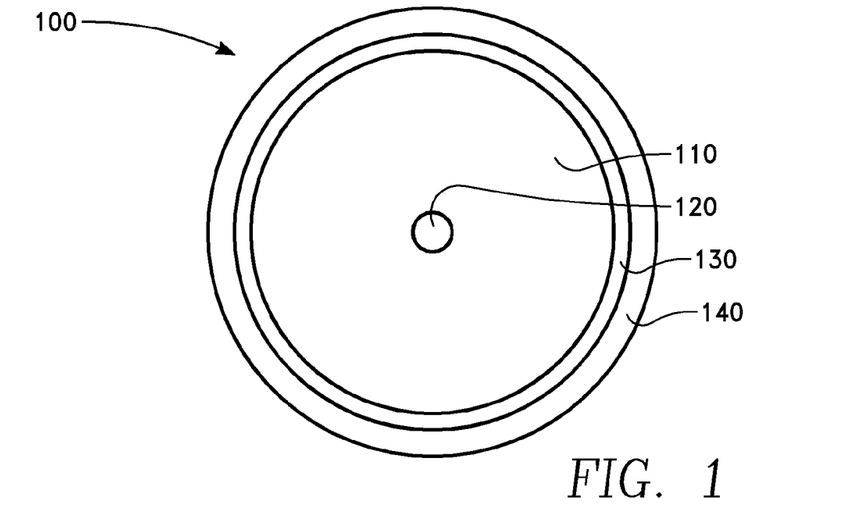
FIG. 1 shows a top view of an embodiment of a tunable acoustic attenuator utilizing an electroactive material membrane.

Turning to FIG. 1, shown is a top view of an embodiment of a tunable acoustic attenuator 100 utilizing an electroactive material membrane 110. The membrane 110 is held within a boundary constraint 140, such as a frame. A mass 120 is located in a central region of the membrane 110. An optional coupler 130 connects the membrane 110 to the boundary constraint 140. In this embodiment, the membrane 110 is composed of an electroactive material that changes material properties to effect the stiffness of the membrane 110 directly.

The membrane 110 may be an electroactive film, such as a piezoelectric ceramic, a dielectric elastomer, or the like. Applying a voltage to the electroactive film of the membrane 110 changes the resonant frequency of the acoustic attenuator 100. For a membrane 110 of dielectric elastomer, applying voltage adjusts the tension in the membrane 110 and shifts the fundamental frequency of the acoustic attenuator 100. For a membrane 110 of piezoelectric material like PZT or PVDF, an applied voltage is used to directly adjust the elastic stiffness of the material. The piezoelectric effect occurs due to the interaction of the applied voltage and the internal dipole. This effect can shift the elastic modulus by two times or more depending on the material involved. Further by patterning the piezoelectric material, it is possible to change the mode that is most strongly interacted with, for example the first or second primary noise transmission modes.

Figure 2A:
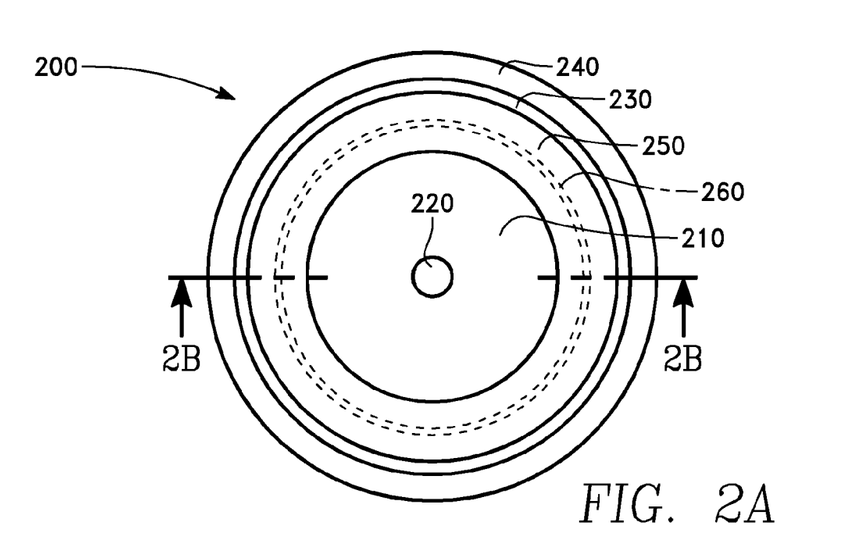
FIG. 2A shows a top view of an embodiment of a tunable acoustic attenuator utilizing a variable stiffness coupler.
Figure 2B:
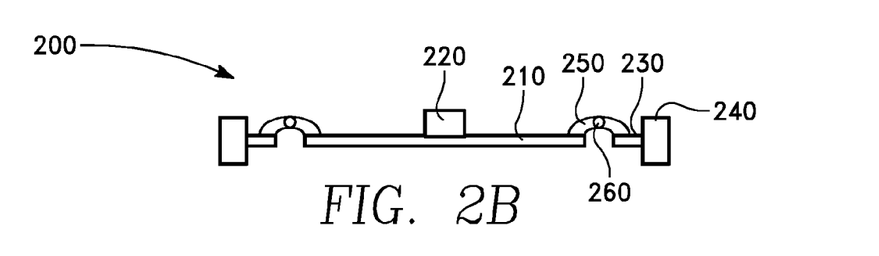
FIG. 2B shows a cut away side view along the 2B-2B line of a tunable acoustic attenuator of FIG. 2A.

Turning to FIGS. 2A & 2B, FIG. 2A shows a top view, and FIG. 2B a corresponding cut away side view along the 2B-2B line of FIG. 2A, of an embodiment of a tunable acoustic attenuator 200 utilizing a variable stiffness coupler 250. In the embodiment shown, the variable stiffness coupler 250 manipulates the planar connectivity of the membrane 210, such as a shape memory material such as a shape memory polymer or SMP to change stiffness in response to an applied thermal energy field. While SMP is used as a example is this discussion, it is also to be understood that other materials with similar temperature stiffness response such as certain polymers such as interpenetrating network polymers may be substituted. In addition, a variable stiffness component can be formed from the layering of two materials, one with a constant temperature or field response and another with a variable field response. Examples of variable stiffness structures are disclosed in U.S. Pat. No. 7,550,189, by McKnight et al., entitled VARIABLE STIFFNESS STRUCTURE, issued Jun. 23, 2009, herein incorporated by reference in its entirety. In some embodiments, it is possible to use a shape memory alloy to couple, either directly or indirectly, the membrane 210 with the frame 240.

In this embodiment, a shape memory polymer coupler 250 couples, either directly or indirectly, the membrane 210 to the frame 240. The dynamic performance of the mass 220 and membrane 210 is adjusted using temperature to adjust modulus of the shape memory polymer coupler 250. Above their Tg, SMPs can recover any deformation accumulated through external loading (especially for loading above Tg). By integrating a small heating element 260 into the structure, it is possible to adjust the modulus of the membrane 210 material and therefore the resonant frequency of the membrane 210 with mass 220.

The SMP compliant coupler 250 amplifies the effect of the change in modulus of a small area of the structure 200. SMP can undergo a change in modulus of up to about 100 times, thus creating a large change in the effective stiffness of the overall membrane 210 and a large shift in the natural frequency.

In various embodiments, the variable stiffness coupler 250 may function as a hinge with a controllable modulus to control the flexibility of the coupler 250, thus controlling the dynamic performance of the mass 220 and the membrane. In other embodiments, the coupler 250 may function as a tensioner to tension the membrane 210, and thus control the dynamic performance of the mass 220 and the membrane 210. Or, the variable stiffness coupler 250 may function as combination of both. In some cases, the entire structure can be fabricated from SMP or SMP like material where only selective portions are actuated.

Figure 3:
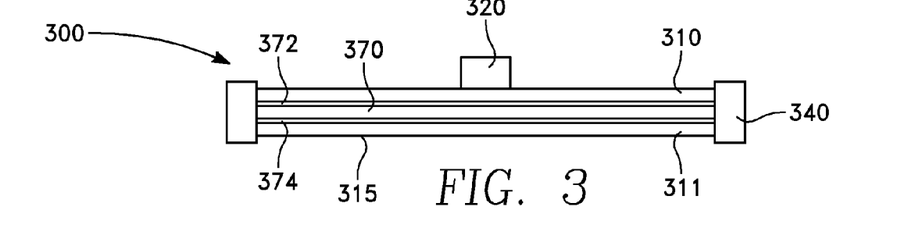
FIG. 3 shows a side view of an embodiment of a tunable acoustic attenuator.

Turning to FIG. 3, shown is a side view of an embodiment of a tunable acoustic attenuator 300 that manipulates the non-planar connectivity of stacked membranes 310 and 311, for example by the incorporation of active material 370, such as electrorheological or ER fluid, to change the effective stiffness of the multi-layer membrane stack 315.

In this embodiment, the active fluid 370 is used to change the overall effective modulus of a thin multi-layer stack 315 of materials. The active fluid 370 is maintained within a sealed reservoir formed between the two thin polymer membranes 310 and 311 mounted to frame 340. The active fluid 370 will connect the membranes 310 and 311 together with varying degrees of force and thus change its overall effective stiffness. For an ER or electrorheological fluid as the active fluid 370, the shear modulus is controlled using applied electric fields.

Thin conducting electrodes 372 and 374 may be applied on the membranes 310 and 311 so that an electric field can be generated when a voltage is applied across these electrodes 372 and 374. This electric field will change increase the shear stiffness and thus increase the resonant frequency of the membrane 310 with mass 320. Thus, using variable shear modulus fluids 370 like electrorheological (ER) fluid, adjustment of the effective stiffness of a thin membrane 310 and actively change its resonant frequencies.

In some embodiments, an MR or magnetorheological fluid may be used as the active fluid 370. In such an embodiment, a coil is used in place of the electrodes 372 and 374, to generate a magnetic field to control the shear modulus of the active fluid 370.

Figure 4A:
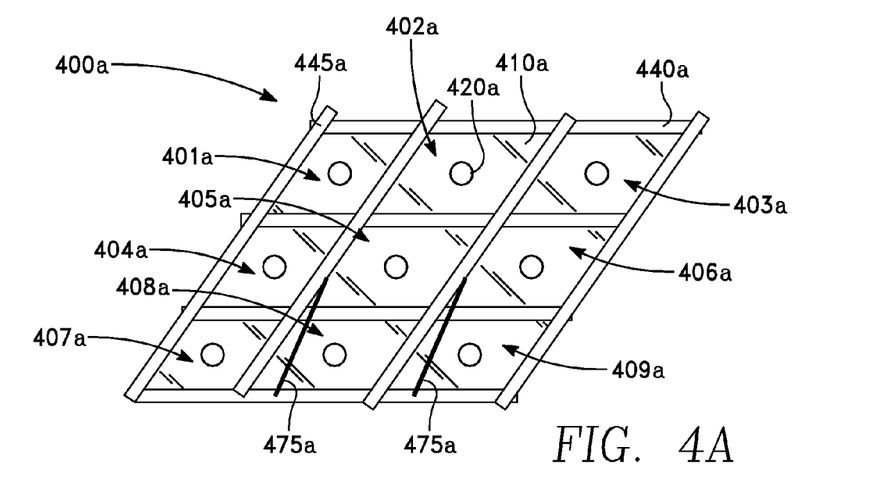
FIG. 4A shows a top view of an embodiment of tunable acoustic attenuator array utilizing adjustment of the tension of the membrane through manipulation of the frame.
Figure 4B:
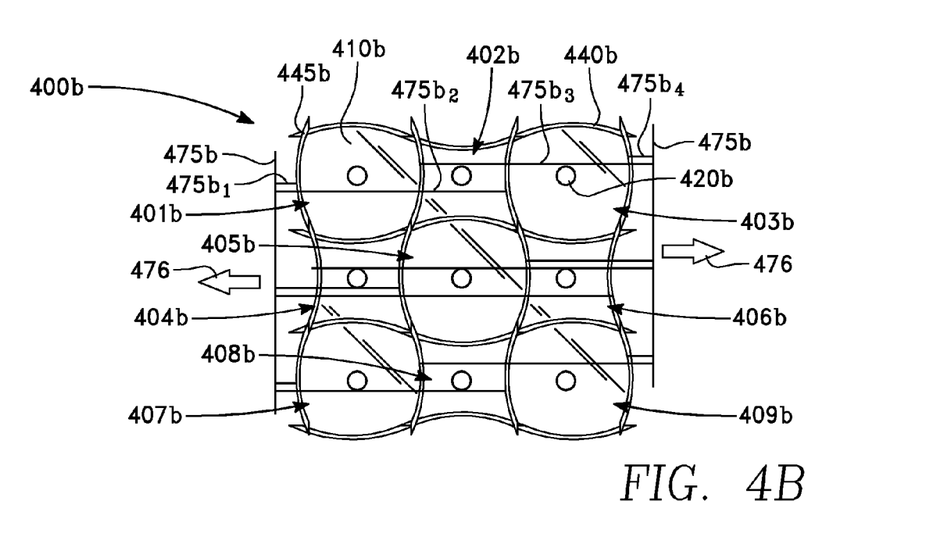
FIG. 4B shows a top view of another embodiment of tunable acoustic attenuator array utilizing adjustment of the tension of the membrane through manipulation of the frame.

Turning to FIGS. 4A and 4B, shown are a top views of a tunable acoustic attenuator array 400a (FIGS. 4a) and 400b (FIG. 4B), utilizing adjustment of the tension of the membrane 410a (FIG. 4A) and 410b (FIG. 4B) through manipulation of the cellular boundary structure or frame 440a (FIG. 4A) and 400b (FIG. 4B). Both FIG. 4A and FIG. 4B provide concepts for adjusting the tension in the membranes 410a (FIG. 4A) and 410b (FIG. 4B) in an array 400a (FIGS. 4a) and 400b (FIG. 4B) of a resonator structure 401a-409a (FIG. 4A) and 401b-409b (FIG. 4B) using deformation in a compliant frame 440a (FIG. 4A) and 400b (FIG. 4B), which may be actuated with active material actuators. Active material actuators could encompass shape memory alloys, piezoelectric materials, electro-ionic materials, etc. In addition traditional actuation such as electromagnetic and hybrids may be considered. The frame 440a (FIG. 4A) and 400b (FIG. 4B) consists of mechanically stationary nodal connections 445a (FIG. 4A) and 445b (FIG. 4B).

In such embodiments, changing the tension of membranes 410a (FIG. 4A) and 410b (FIG. 4B) controls the resonance of the mass 420a (FIG. 4A) and 420b (FIG. 4B) membrane 410a (FIG. 4A) and 410b (FIG. 4B) structures 401a-409a (FIG. 4A) and 401b-409b (FIG. 4B). The effective properties of the cell structures 401a-409a and 401b-409b are controlled by changing the boundaries 440a and 440b, which in turn changes the tension of the structures 401-409. The effectiveness of this approach depends on the stiffness of the material used as the membranes 410. For stiff membrane materials, such as engineering thermoplastics like polycarbonate, small changes at the boundary 440 can cause large changes in tension and thus large changes in resonant frequency. For a circular membrane under tension, the resonant frequency is proportional to the square root of tension. Therefore, changing the tension by a factor of 4 will shift the resonance by a factor of 2.

In FIG. 4A, shown is one implementation to actively control the tension in an array 400 of mass 420 and membrane 410 resonators 401-409 using active material actuators 475. A series of membranes 410 are affixed to a compliant frame structure 440 under tension. The tension can be generated due to thermal shrinkage or coefficient of linear thermal expansion (CTE) mismatch effects. Actuators 475 connected to the frame 440 can be used to induce small changes in the geometry of the frame 440 and thus changes in tension to the membranes 410. The actuator 475 may be a shape memory alloy wire, although other active material technologies may be suitable, such as for example including piezoelectric polymers and ceramics, depending on the exact configuration of the actuator 475 and frame 440 assembly. Many other potential embodiments and configurations are possible consistent with the approach disclosed herein. The deformable frame 440 supports the membranes 410 and an active material actuator 475 adjusts the tension.

In the embodiment of FIG. 4A, the tunable acoustic attenuator array 400a has a frame 440a is rigid or semi-rigid so that an applied force changes the angle of incidence of the side walls of the cells 401a-409a. Thus, the cells 401a-409a can be adjusted from right angle parallelogram to an oblique angle parallelogram, such as square to rhombus, or rectangle to rhomboid.

In the embodiment of FIG. 4B, the tunable acoustic attenuator array 400b has a flexible, or semi-rigid frame 440b which flexes when actuators 475b are actuated. Force applied by the actuators 475b are transmit to the 440b frame portion surrounding each cell 401b-409b or cell walls via couplers $475b_1$ to $475b_4$, for example. The force on the cell walls causes them to flex or bend, thereby changing the tension of the membrane 410b. Arrows 476 show a possible direction of actuation to cause the bending of the cell walls shown for illustration purposes in FIG. 4B. As such, this embodiment utilizes active control of the tension of the membrane 410b to actively control the properties of the resonator 400b. The actuators 475b, or couplers $475b_1$-$475b_4$, for example, may employ conventional actuators, or they may incorporate active material actuators 475b. Moreover, 475b may be fixed with couplers $475b_1$-$475b_4$, for example, providing the actuation force.

Figure 5A:
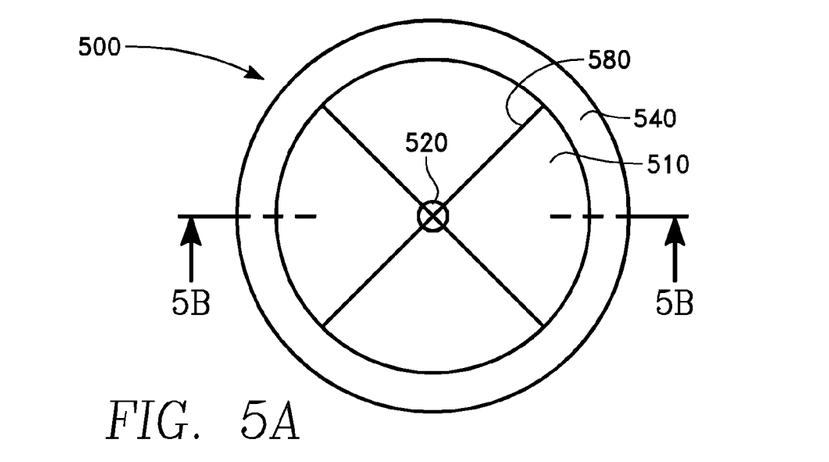
FIG. 5A shows a bottom view of an embodiment of a tunable acoustic attenuator utilizing active material tendons to change the mass vibration amplitude.
Figure 5B:
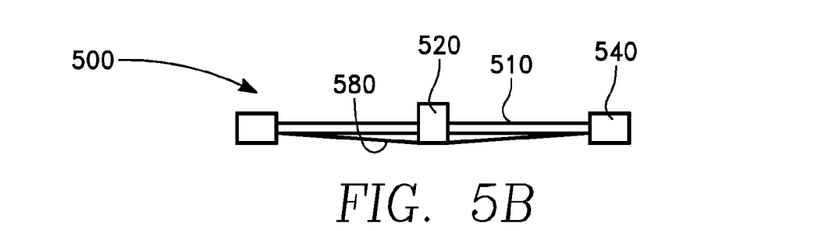
FIG. 5B shows a cut away side view of the tunable acoustic attenuator of FIG. 5A along the 5B-5B line.

Turning to FIG. 5A, shown is a bottom view of an embodiment of a tunable acoustic attenuator 500 utilizing active material tendons 580 to change the mass vibration amplitude. FIG. 5B is a cut away side view of FIG. 5A along the 5B-5B line. In this embodiment, a small amount of active materials is incorporated to change the response of the membrane 510. Since active materials, such as shape memory alloys, are relatively stiff compared to polymer based membrane materials, a small wire or film can be used to dramatically change the resonant properties. In this embodiment, the membrane 510 is used more as a collector of acoustic pressure energy, which is then coupled to the active material tendon 580. Many active materials such as shape memory alloys and piezoelectric materials undergo changes in modulus with phase changes. Applying an activation signal or energy to these materials will effectively change the vibration amplitude of the moving central mass 520.

The active material tendon 580 is connected at its ends to the frame 540 and couples to the membrane 510 via the central mass 520, as the tendon 580 is in direct contact with the mass 520. The effective stiffness of the entire structure 500 is a collection of that from the membrane 510 and the tendon 580. By applying a control signal (not shown), for example current to a shape memory alloy or voltage to a piezofiber, the vibration amplitude of the moving central mass 520 can be adjusted to actively tune the transmission loss through the acoustic attenuator 500.

Figure 5C:
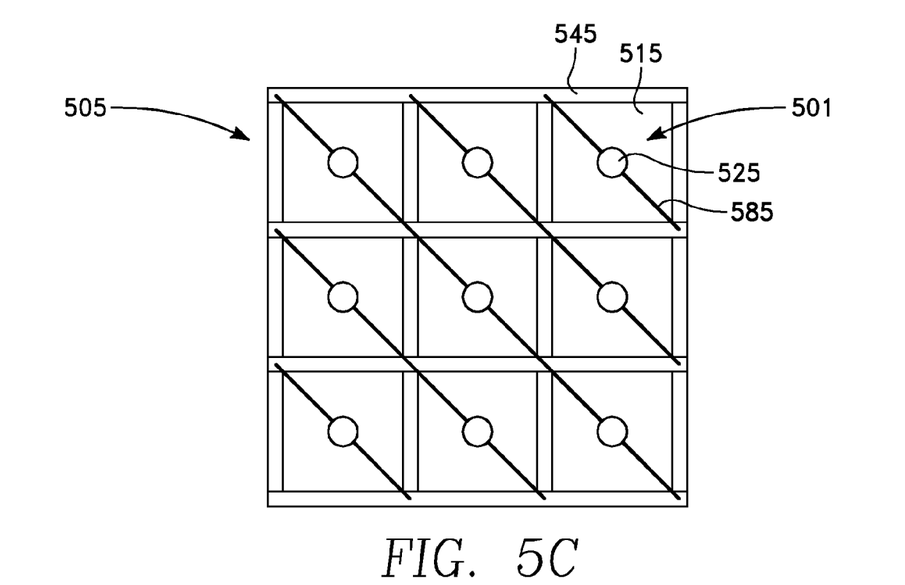
FIG. 5C shows a top view of an array of acoustic attenuators utilizing active material tendons to change the mass vibration amplitude.

FIG. 5C shows a top view of an array 505 of acoustic attenuators 501. In this embodiment, the active material tendon 585 is secured at ends to the fixed frame 545, and connects to one or more central mass 525 to influence the attenuation of one or more of the membranes 515.

FIGS. 5A-5C provide active material tendons 580 (FIGS. 5A-5B) and 585 (FIG. 5C) into membrane structures that can be used to tune the resonant frequencies. The membrane 510 (FIGS. 5A-5B) and 515 (FIG. 5C) collects the acoustic energy and focuses into the active material tendons 580 (FIGS. 5A-5B) and 585 (FIG. 5C), thus requiring less of the more expensive active material to be used.

Figure 6A:
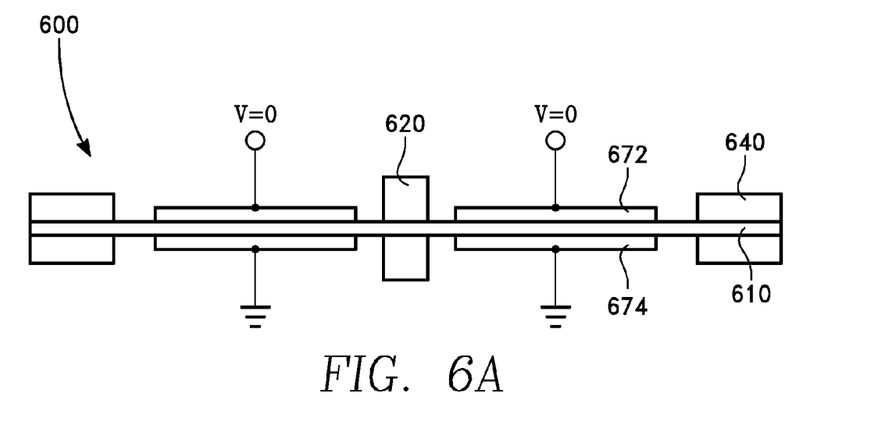
FIG. 6A shows a cut away side view of an embodiment of a tunable acoustic attenuator with a membrane made from a dielectric elastomer, without an applied voltage.
Figure 6B:
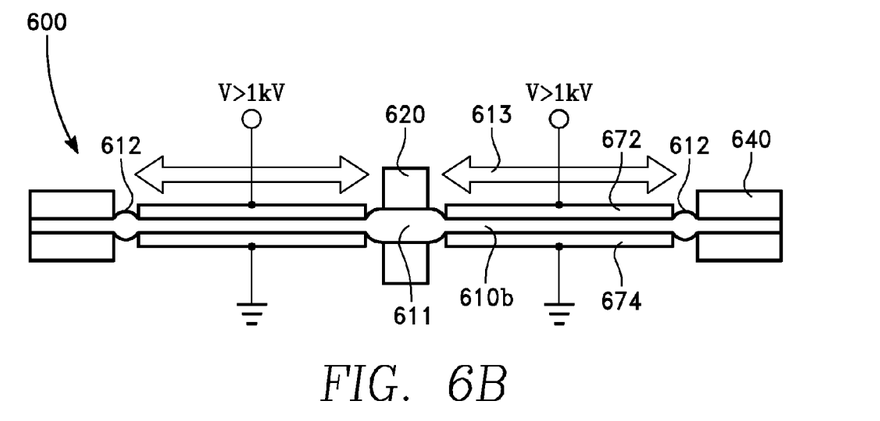
FIG. 6B shows a cut away side view of the tunable acoustic attenuator embodiment of FIG. 6A with an applied voltage.

FIGS. 6A and 6B show cut away side views of a tunable acoustic attenuator 600 utilizing an electroactive polymer membrane 610. An electroactive polymer affects the stiffness of the membrane through changes in tension of the membrane 610. FIG. 6A shows a cut away side view of a tunable acoustic attenuator 600 with a membrane 610 made from a dielectric elastomer, with the applied electrode voltage V off or set to zero. FIG. 6B shows a cut away side view of the tunable acoustic attenuator 600 of FIG. 6A, showing the deformation 612 of the membrane 610b with a high applied voltage V, such as for example greater than 1 kV for one embodiment. In various embodiments, the electroactive polymer membrane 610 may use artificial muscle, dielectric elastomer technology, or the like.

In the embodiment show in FIGS. 6A and 6B, the structure of the attenuator 600 is a planar, rigid structural core or frame 640 structure that has a large area fraction of open area to which is attached a film or membrane 610 of tensioned dielectric elastomer material, or a passive film to which is bonded a polymeric actuator film, such as PVDF. A mass 620 is attached to the center of the membrane 610 to help specify the quality factor and fundamental resonant frequency. The membrane 610 covers the open area within the frame 640, and has electrodes 672 and 674 that substantially cover the membrane 610 in the open area.

An array of actuators 600 may be formed to cover large areas. Thus, a combined spatial actuator array may have different activation states depending on the desired acoustic response. The electrode is implemented in a manner to accommodate the electrostatic-induced deformations in the membrane 610. Moreover, in some embodiments (not shown), multiple layers of the attenuators 600, or the other attenuators disclosed herein, may be used to add a thickness component to aide acoustic transmission loss at different or overlapping acoustic frequencies.

The frame 640 for this or other embodiments, or in other embodiments, may be metals and/or alloys, structural ceramics, or polymer matrix composites. In one embodiment a G10 grade epoxy/glass fiber based composite, available from Atlas Fibre Company, Skokie, Ill., www.atlasfibre.com.

The dielectric elastomer materials are acylate-based, urethane based, or silicone-based elastomers, such as VHB™ elastomeric films, 4910 and 4905, available from 3M, Saint Paul, Minn., www.3m.com, and SILASTIC® LC20-2004 silicone from Dow Corning, Corning, N.Y., www.dowcorning.com. The electrostrictive polymer variant is specially irradiated and poled PVDF from Measurement Specialties Inc., Hampton, Va., www.meas-spec.com. These membranes or films 610 may be bonded to the frame 640 with cyanoacrylate-based or epoxy-based adhesives.

Electrodes 672 and 674 are attached to each side of the films 610 via conductive grease, low temperature soldering or mechanical contact to a conductive metallic strip/trace or wire lead. In array form, the electrical leads or traces may be integrated into the frame 610 to minimize weight and integration challenges. These films may be coated with dielectric gels, dielectric coatings or other films to prevent electrical shorting, isolation from any primary structure it may be mounted with/to, or to prevent breakdown of the device (or arcing) in air.

The size of the openings within the frame 640 are based upon the targeted acoustic response frequencies, which for example can be between 20-200 Hz. The target size range of these openings is approximately 0.5 inch to 3 inches. One embodiment discussed with reference to FIGS. 7 and 8, has an opening of approximately 1 inch. The thickness of the film is between 0.0005 and 0.010 inches. The electrodes 672 and 674 are 100-1000× (times) thinner than the elastomer or polymer film 610. The dielectric elastomer used is 200%×200% prestrained 4905 VHB™ which is approximately 0.004 inches thick. In this material, greater initial prestrain will result in desirably higher quality factor, greater tunable resonant/anti-resonant frequency. The range of prestrains for this material is between the 100%×100% to approximately 500%×500%. In some embodiments, anisotropic prestrain is not desirable.

The active film 610 is mechanically connected the frame 640 structure on one or both sides of the film via mechanical clamping or adhesives. The electrodes 672 and 674 may be physically separate from the frame 640 structure in some embodiments. But, in embodiments with a metallic frame, the ground electrode may be electrically connected to the frame 640 structure, reducing the amount and weight of wiring. The film 610 covers the entire area within the frame 640*a*, while the electrodes cover a substantial proportion of the free standing film 610. In some embodiments, multiple layers of film 610 are spaced in the thickness direction and may be connected by the same, or substantially different frame 640 geometries.

In some embodiments, to shift the resonant frequency of the attenuator 600, a high voltage V (but less than the breakdown voltage in air or the film material) is applied through the thickness of the membrane 610. The differential (decrease) in tension varies with the square of the voltage, as shown below by Equation 1 (and thus the local electric field):

$$\sigma = \frac{1}{2}\varepsilon_0\varepsilon_r\left(\frac{V}{t}\right)^2. \quad \text{Equation 1}$$

The modulus of the membrane 610, and thus the effective stiffness of the attenuator 600 is a quadratic function of the applied voltage in the membrane 610.

In one embodiment, where the electrodes 672 and 674 go to the edge of the frame 640, the electric field induced deformation may increase the tensile stress in the film such that the area slightly increases. In some embodiments, it is undesirable to let the area increase enough such that the film goes slack. In an another embodiment, the electrodes 672 and 674 stops short of the edge of the frame 640 and the electric field induced deformation decreases the tension across the entire membrane 610, but reduces the prestrain in the unelectroded regions because this area 612 (FIG. 6B) takes up the area change from the more highly tensioned area. This is illustrated in FIGS. 6A and 6B.

As mentioned above, at high prestrains, the change in membrane 610 stiffness is proportional to the change in tension. The stiffness change not only modulates the quality factor, Q, Equation 2, but also the first fundamental (or natural) frequency $f_0$, Equation 3, shown below:

$$Q = \frac{\sqrt{mk}}{c}; \text{ and} \quad \text{Equation 2}$$

$$f_0 = \frac{1}{2\pi}\sqrt{\frac{k}{m}}. \quad \text{Equation 3}$$

Figure 7:
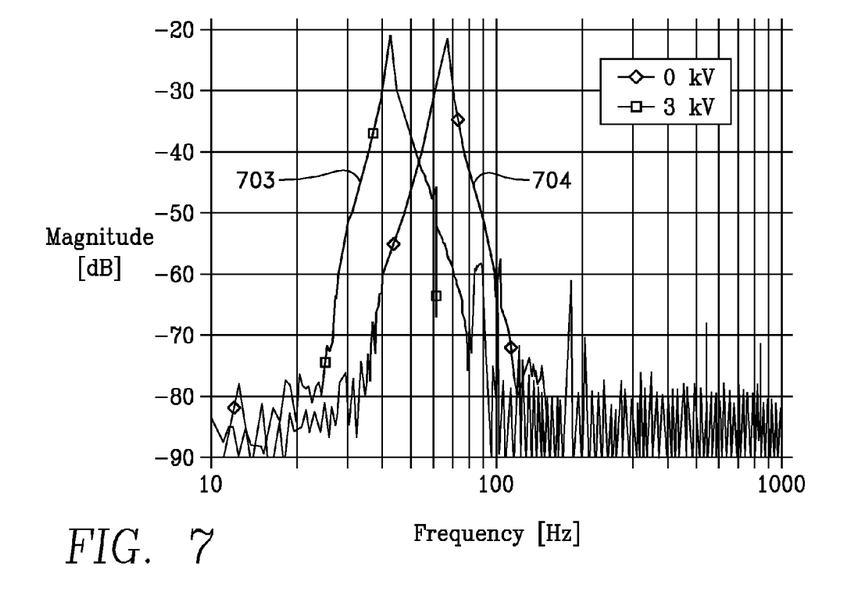
FIG. 7 shows curves of a voltage tunable resonant frequency acoustic attenuator for a dielectric elastomer membrane embodiment.

Thus, a change in the control voltage of the dielectric elastomer membrane changes the resonant and anti-resonant frequency as shown in FIG. 7. This change in resonance can be used to change the acoustic transmission properties at a specific frequency or range of frequencies as shown along the horizontal axis in FIG. 7, and by curve 801 in FIG. 8. For a selected set of frequencies, or a constant frequency, the transmitted acoustic power may be reduced significantly, −30 db at 40 Hz, as shown in FIG. 7 comparing 0 kV applied voltage for curve 703 and 3 kV applied voltage for curve 704. This is also shown in FIG. 8 by curve 802, for this embodiment.

FIG. 7 shows curves of the voltage tunable resonant frequency for a diaphragm of −200%×200% prestrained VHB™ 4905 film. The two curves 704 and 703 show the change in resonant frequency as a result of changing a static applied voltage of 0 kV and 3 kV, respectively, to the dielectric elastomer film. By shifting this frequency, we are also able to shift the antiresonant frequency of this membrane and thus control the band over which acoustic energy is rejected. Since the electroactive polymer is largely dielectric (or capacitive), the power required to hold the tuned frequency is minimal.

Figure 8:
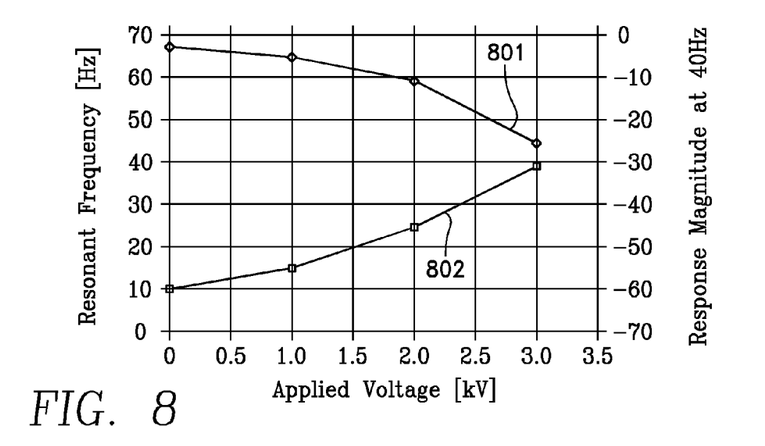
FIG. 8 shows a curve of the resonant frequency at constant output magnitude due to applied voltages and a curve showing the change in output magnitude at constant frequency (40 hz) due to applied voltages.

Embodiments are not limited to the frequencies show in the graphs of FIGS. 7 and 8. Tunable acoustic attenuators may be designed for tuning within, or around, various frequency ranges, as desired for different applications.

Thus, in various embodiments, changes in membrane/mass response may be accomplished with an active material including a modulus changing material such as electroactive film, SMP, an ER fluid, an MR fluid, etc. In various embodiments, a change in tension of the membrane may be accomplished mechanically, with a compliant frame motor, or actuator, with an active material such as a shape memory alloy wire. In various embodiments, a change in the tension of a mass connected tendon, which may be an active material tendon, changes membrane/mass response.

In various embodiments, a solid-state active material is used to modulate or tune the resonant properties and acoustic transmission loss properties of a low mass diaphragm. Thus, by applying a control/stimulus signal to the active material which is either the diaphragm itself or the attached/bonded active materials, the low mass diaphragm changes the geometry and material properties to actively adapt to the incident acoustic stimulation for in-situ acoustic control. Various embodiments have the potential to significantly reduce the mass and the size of acoustic control to benefit the design of the light weight systems.

Various embodiments allow active control of noise transmission through structures. The frequency of noise sources may change due to manufacturing variations (e.g. intentional differences in seals used to for passenger compartment, or unintentional variations due to structural weld quality or material composition), operational characteristics (e.g. engine noise spectrum changes as a function of RPM, wind noise spectrum and magnitude changes as function of speed). Therefore, as the incident acoustic energy changes in frequency, it is possible with various implementations, to maintain high performance acoustic transmission prevention by changing the inherent resonant frequencies of the membrane. This can be done with control circuits and low power application as compared to traditional active noise cancellation systems incorporating both sensors and high performance feedback control to actuators on structural components.

An advantage of various embodiments is that they may not only have better acoustic transmission loss than the "mass law" would predict over a discrete frequency range, but also the discrete frequency range is tunable by the control/stimulus signal.

Various embodiments are potentially useful across a broad range of products which could benefit from light-weight, compact and broadband acoustic barrier. For example, propulsion-borne and aero-borne noise sources and the desire to reduce the magnitude of the noise for the occupants. Noise along with vibration and harshness or NVH, is associated with customer satisfaction, which is more important for a personal product (i.e. car) than for a functional (airliner) or a performance (i.e. jet fighter) based product. But, it is expected that various embodiments could dramatically impact acoustics performance in all weight sensitive, human occupant, mobile platforms.

By tailoring the resonance of the structure to actively control the system and reflect incident noise, various embodiments have the advantages of being lighter-weight with high isolating quality and low-frequency operation over the traditional material limits. Furthermore, not only are various embodiments the lightest and most compact designs as compared to traditional soundproofing apparatus, but because of the light/compliant nature of the configuration, various embodiments can be operated in ultra low-frequency range with very high soundproofing quality.

Moreover, various embodiments provide a wider band of noise attenuation because it is tailorable to various environmental conditions. By having active control of material properties and/or dimension of the structure, various embodiments allow tailoring of the acoustic performance in-situ. Since the attenuation effect of a membrane/mass attenuator can have strong frequency dependence, active control of the membrane/mass structure improves upon the structures effectiveness to mitigate variable tonal noise sources.

Additionally, various embodiments may be more precise and not as subject to environmental temperature changes because they may be actively tuned. Active tailoring may be conducted to target or adapt the environmental condition in-situ.

To cover large areas, arrays of acoustic attenuator membranes are assembled which can then be placed conformably around areas that need protection from incident sound energy, such as vehicle interiors. This approach may also be useful for protecting cargo and sensitive instruments subject to intense sound fields such as during the launch of a satellite onboard a rocket.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or member can actually be representative or equivalent members. Again, these are implicitly included in this disclosure. Where the invention is described in device-oriented terminology, each member of the device implicitly performs a function. It should also be understood that a variety of changes may be made without departing from the essence of the invention. Such changes are also implicitly included in the description. These changes still fall within the scope of this invention.

Further, each of the various members of the invention and claims may also be achieved in a variety of manners. This disclosure should be understood to encompass each such variation, be it a variation of any apparatus embodiment, a method embodiment, or even merely a variation of any member of these. Particularly, it should be understood that as the disclosure relates to members of the invention, the words for each member may be expressed by equivalent apparatus terms even if only the function or result is the same. Such equivalent, broader, or even more generic terms should be considered to be encompassed in the description of each member or action. Such terms can be substituted where desired to make explicit the implicitly broad coverage to which this invention is entitled. It should be understood that all actions may be expressed as a means for taking that action or as a member which causes that action. Similarly, each physical member disclosed should be understood to encompass a disclosure of the action which that physical member facilitates. Such changes and alternative terms are to be understood to be explicitly included in the description.

While the present invention has been described in connection with certain exemplary embodiments, it is to be understood that the invention is not limited to the disclosed embodiments, on the contrary, it is intended to cover various modifications and equivalent arrangements included within the spirit and scope of the appended claims, and equivalents thereof.

What is claimed is:

1. An actively tunable acoustic attenuator comprising:
    a) a frame;
    b) a plurality of membrane layers within the frame;
    c) an active material between at least two of the plurality of membrane layers; and
    d) a mass secured to at least one of the plurality of membrane layers.

2. The actively tunable acoustic attenuator of claim 1, wherein the active material comprises a material responsive to an applied energy field to adjust effective stiffness of the plurality of membrane layers.

3. The actively tunable acoustic attenuator of claim 2, wherein the active material comprises the material with a variable viscosity in response to an applied energy field.

4. The actively tunable acoustic attenuator of claim 1, wherein the active material comprises an electrorheological material.

5. The actively tunable acoustic attenuator of claim 2, further comprising a plurality of electrodes adjacent to the plurality of membranes.

6. The actively tunable acoustic attenuator of claim 1, wherein the active material comprises a magnetorheological material.

7. The actively tunable acoustic attenuator of claim 6, further comprising a plurality of coils adjacent to the plurality of membranes.

8. The actively tunable acoustic attenuator of claim 1 further comprising a plurality of electrodes between the plurality of membrane layers.

9. The actively tunable acoustic attenuator of claim 8, wherein each of the plurality of electrodes is located between one of the plurality of membrane layers and the active material.

10. The actively tunable acoustic attenuator of claim 9, wherein each of the plurality of electrodes are located adjacent to one of the plurality of membranes.

11. The actively tunable acoustic attenuator of claim 1 wherein the active material is contained within a reservoir between at least two of the plurality of membranes layers.

12. The actively tunable acoustic attenuator of claim 1 wherein the plurality of membrane layers comprises a pair of membrane layers, and wherein the plurality of electrodes comprises a pair electrodes each being adjacent to a respective one of the pair of opposing membrane layers, and wherein the active material is contained within a sealed reservoir formed by the pair of membrane layers.

13. The actively tunable acoustic attenuator of claim 12, wherein the pair of electrodes are located between the pair of membrane layers and the active material.

\* \* \* \* \*